US011332256B2

(12) United States Patent
Hon et al.

(10) Patent No.: US 11,332,256 B2
(45) Date of Patent: May 17, 2022

(54) FAULT TOLERANT HYBRID ELECTRIC PROPULSION SYSTEM FOR AN AERIAL VEHICLE

(71) Applicant: General Electric Company, Schenectady, NY (US)

(72) Inventors: Robert Charles Hon, Walton, KY (US); Paul Robert Gemin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 111 days.

(21) Appl. No.: 16/106,601

(22) Filed: Aug. 21, 2018

(65) Prior Publication Data

US 2020/0062414 A1   Feb. 27, 2020

(51) Int. Cl.
| | |
|---|---|
| *B64D 31/06* | (2006.01) |
| *B60W 10/06* | (2006.01) |
| *B60W 10/08* | (2006.01) |
| *B60W 20/10* | (2016.01) |
| *B64D 27/24* | (2006.01) |
| *B64D 37/00* | (2006.01) |
| *B64D 45/00* | (2006.01) |
| *B64D 27/02* | (2006.01) |

(52) U.S. Cl.
CPC ............ *B64D 31/06* (2013.01); *B60W 10/06* (2013.01); *B60W 10/08* (2013.01); *B60W 20/10* (2013.01); *B64D 27/24* (2013.01); *B64D 37/00* (2013.01); *B64D 45/00* (2013.01); *B60W 2710/0666* (2013.01); *B60W 2710/083* (2013.01); *B64D 2027/026* (2013.01)

(58) Field of Classification Search
CPC ........ B64D 31/06; B64D 27/24; B64D 37/00; B64D 45/00; B64D 2027/026; B60W 10/06; B60W 10/08; B60W 20/10; B60W 2710/066
See application file for complete search history.

(56) References Cited

U.S. PATENT DOCUMENTS

| | | | |
|---|---|---|---|
| 4,104,876 A | 8/1978 | Larsen et al. | |
| 4,500,966 A * | 2/1985 | Zagranski | ................ F02C 9/46 701/116 |
| 4,625,123 A | 11/1986 | Gillett et al. | |

(Continued)

FOREIGN PATENT DOCUMENTS

EP   2581308 A2   4/2013

OTHER PUBLICATIONS

M.V. Subramanyam, Robust Control of Steam Turbine System Speed Using Improved IMC Tuned PID Controller, 2012, Procedia Engineering 38 (Year: 2012).*

(Continued)

*Primary Examiner* — Mahmoud S Ismail
*Assistant Examiner* — Gabriel Anfinrud
(74) *Attorney, Agent, or Firm* — Dority & Manning, P.A.

(57) ABSTRACT

Hybrid electric propulsion systems and methods therefore are provided. More particularly, the present disclosure is directed to control systems for hybrid electric propulsion systems for aerial vehicles that are configured for rapidly and automatically taking action in response to rapid electrical load changes on a torque source, such as an engine. Methods for operating hybrid electric propulsion systems for aerial vehicles are also provided.

20 Claims, 5 Drawing Sheets

(56) References Cited

U.S. PATENT DOCUMENTS

| | | | |
|---|---|---|---|
| 4,695,221 A | 9/1987 | Swearingen | |
| 5,480,107 A | 1/1996 | Bacon | |
| 5,635,768 A | 6/1997 | Birch et al. | |
| 5,704,209 A * | 1/1998 | Bronicki | F01K 23/10 60/650 |
| 6,401,446 B1 | 6/2002 | Gibbons | |
| 6,625,504 B2 | 9/2003 | Landreth | |
| 6,777,822 B1 | 8/2004 | Suttie et al. | |
| 6,787,933 B2 | 9/2004 | Claude et al. | |
| 6,881,027 B2 | 4/2005 | Klaas et al. | |
| 7,188,475 B2 | 3/2007 | McGinley et al. | |
| 7,251,942 B2 | 8/2007 | Dittmar et al. | |
| 7,340,901 B2 | 3/2008 | Riley | |
| 7,367,193 B1 | 5/2008 | Thompson | |
| 7,704,110 B2 | 4/2010 | Wiatrowski et al. | |
| 7,707,838 B2 | 5/2010 | Sheldon et al. | |
| 7,725,236 B2 | 5/2010 | Delaloye et al. | |
| 7,748,209 B1 | 7/2010 | Schopf et al. | |
| 7,975,465 B2 | 7/2011 | Morris et al. | |
| 8,127,548 B2 | 3/2012 | Anson et al. | |
| 8,261,527 B1 | 9/2012 | Stearns et al. | |
| 8,286,432 B2 | 10/2012 | Anson | |
| 8,310,076 B2 | 11/2012 | Jones et al. | |
| 8,321,119 B2 | 11/2012 | Van Vactor et al. | |
| 8,549,833 B2 | 10/2013 | Hyde et al. | |
| 8,622,342 B2 | 1/2014 | Filho | |
| 8,657,227 B1 | 2/2014 | Bayliss et al. | |
| 8,825,237 B2 | 9/2014 | Covington et al. | |
| 9,008,942 B2 | 4/2015 | Dyrla et al. | |
| 9,267,437 B2 | 2/2016 | Perry et al. | |
| 9,267,438 B2 | 2/2016 | Dooley et al. | |
| 9,267,480 B1 | 2/2016 | Luyks | |
| 9,303,566 B2 | 4/2016 | Haillot | |
| 9,366,182 B2 | 6/2016 | Rodriguez | |
| 9,404,419 B2 | 8/2016 | Haillot | |
| 9,458,770 B2 | 10/2016 | Anghel et al. | |
| 9,494,085 B2 | 11/2016 | Cai | |
| 9,586,690 B2 | 3/2017 | Rajashekara et al. | |
| 9,689,316 B1 | 6/2017 | Crom | |
| 9,815,450 B2 | 11/2017 | Kim | |
| 9,914,536 B2 | 3/2018 | Rossotto | |
| 10,006,375 B1 | 6/2018 | Wagner et al. | |
| 10,469,007 B2 * | 11/2019 | Nayfeh | B60W 20/10 |
| 2002/0115531 A1 * | 8/2002 | Degroot | F16H 61/16 477/92 |
| 2002/0195821 A1 | 12/2002 | Wacknov | |
| 2005/0147490 A1 * | 7/2005 | Soucy | F02C 9/56 415/1 |
| 2007/0018035 A1 | 1/2007 | Saiz et al. | |
| 2009/0302152 A1 | 12/2009 | Knight | |
| 2010/0059300 A1 * | 3/2010 | Brown | B60L 15/2009 180/65.285 |
| 2013/0094963 A1 | 4/2013 | Rolt | |
| 2013/0227950 A1 | 9/2013 | Anderson et al. | |
| 2014/0053567 A1 * | 2/2014 | Langenbacher | F02C 9/26 60/773 |
| 2014/0145028 A1 | 5/2014 | Gomez | |
| 2014/0260306 A1 | 9/2014 | Dooley et al. | |
| 2015/0089921 A1 | 4/2015 | Rideau et al. | |
| 2015/0284103 A1 * | 10/2015 | Swann | F02C 9/42 701/3 |
| 2015/0337740 A1 | 11/2015 | Heiberger et al. | |
| 2016/0053690 A1 | 2/2016 | Perkinson et al. | |
| 2016/0153326 A1 | 6/2016 | Muller et al. | |
| 2016/0229513 A1 | 8/2016 | Scheel et al. | |
| 2017/0058786 A1 * | 3/2017 | Stockwell | F02C 9/26 |
| 2017/0253342 A1 | 9/2017 | De Magalhaes Gomes | |
| 2017/0320585 A1 | 11/2017 | Armstrong et al. | |
| 2018/0057173 A1 | 3/2018 | Sautron | |
| 2018/0115265 A1 | 4/2018 | Nayfeh et al. | |

OTHER PUBLICATIONS

European Search Report Corresponding to Application No. 19191271 dated Jan. 20, 2020.

* cited by examiner

300

302 — RECEIVE, FROM ONE OR MORE SENSING DEVICES POSITIONED ONBOARD THE AERIAL VEHICLE, ONE OR MORE PERFORMANCE INDICATORS INDICATIVE OF AN ELECTRICAL LOAD ON THE ENGINE, THE ENGINE MECHANICALLY COUPLED WITH AN ELECTRIC MACHINE CONFIGURED TO GENERATE ELECTRICAL POWER WHEN DRIVEN BY THE ENGINE, THE ELECTRIC MACHINE ELECTRICALLY COUPLED WITH ONE OR MORE POWER CONSUMING DEVICES, WHEREIN AT LEAST ONE OF THE ONE OR MORE POWER CONSUMING DEVICES ARE MECHANICALLY COUPLED WITH A PROPULSION ASSEMBLY

304 — DETERMINE WHETHER AN ELECTRICAL LOAD DROP ON THE ENGINES IS PRESENT BASED AT LEAST IN PART ON THE ONE OR MORE PERFORMANCE INDICATORS

306 — GENERATE, IF THE ELECTRICAL LOAD DROP ON THE ENGINE IS PRESENT, A CONTROL ACTION IN RESPONSE TO THE ELECTRICAL LOAD DROP, WHEREIN GENERATING THE CONTROL ACTION COMPRISES REDUCING A FUEL FLOW TO THE ENGINE

FIG. 5

FAULT TOLERANT HYBRID ELECTRIC PROPULSION SYSTEM FOR AN AERIAL VEHICLE

FIELD

The present subject matter relates generally to hybrid electric propulsion systems for aerial vehicles and methods for operating the same. More particularly the present subject matter is directed to control systems for hybrid electric propulsion systems for aerial vehicles that are configured for detecting and taking action in response to rapid electrical load changes.

BACKGROUND

Parallel hybrid electric propulsion systems for aerial vehicles typically include a combustion engine or other mechanically-driven powerplant that drives a generator to produce electrical power. The combustion engine may also drive a source of thrust for the aerial vehicle, such as a propeller. The electrical power generated by the generator is utilized to drive an additional source of thrust. For instance, the electrical power may be provided to an electric motor that utilizes the electrical power to drive the additional thrust source, such as a propeller on the other side of the aerial vehicle.

Such systems inherently contain single failures that, due to electrical coupling, can produce changes in vehicle thrust and thrust asymmetry that are more severe than non-hybrid systems. Moreover, rapid electrical load changes may cause significant and unsafe aircraft handling issues. Additionally, rapid changes to engine torque can lead to overspeed issues, among others.

Accordingly, a control system for a hybrid electric propulsion system for an aerial vehicle and methods therefore that address one or more of the challenges noted above would be useful.

BRIEF DESCRIPTION

Aspects and advantages of the invention will be set forth in part in the following description, or may be obvious from the description, or may be learned through practice of the invention.

In one aspect, the present disclosure is directed to a hybrid electric propulsion system for an aerial vehicle. The hybrid electric propulsion system includes an engine and a first electric machine mechanically coupled with the engine and configured to generate electrical power when driven by the engine. The hybrid electric propulsion system also includes one or more power consuming loads electrically coupled with the first electric machine and configured to receive electrical power from the first electric machine. The one or more power consuming loads include a second electric machine, among other potential power consuming loads. Further, the hybrid electric propulsion system includes a propulsion assembly mechanically coupled with the second electric machine and configured to produce thrust when driven by the second electric machine. Moreover, the hybrid electric propulsion system includes one or more sensing devices positioned onboard the aerial vehicle for detecting one or more performance indicators indicative of an electrical load on the engine. In addition, the hybrid electric propulsion system includes one or more controllers communicatively coupled with the one or more sensors. The one or more controllers are configured to receive, from the one or more sensing devices, the one or more performance indicators indicative of the electrical load on the engine; determine whether an electrical load change is present based at least in part on the one or more performance indicators; and generate, if the rapid electrical load change is present, a control action in response to the electrical load change.

In another aspect, the present disclosure is directed to a method for operating a hybrid electric propulsion system for an aerial vehicle. The method includes receiving, from one or more sensing devices positioned onboard the aerial vehicle, one or more performance indicators indicative of an electrical load on the engine, the engine mechanically coupled with an electric machine configured to generate electrical power when driven by the engine, the electric machine electrically coupled with one or more power consuming devices, wherein at least one of the one or more power consuming devices are mechanically coupled with a propulsion assembly. The method also includes determining whether an electrical load decrease on the engine is present based at least in part on the one or more performance indicators. The method further includes generating, if the electrical load decrease on the engine is present, a control action in response to the electrical load decrease, wherein generating the control action comprises reducing a fuel flow to the engine.

In a further aspect, the present disclosure is directed to a hybrid electric propulsion system for an aerial vehicle. The hybrid electric propulsion system includes an engine. The hybrid electric propulsion system also includes a first propulsion assembly mechanically coupled with the engine and configured to produce thrust when driven by the engine. Further, the hybrid electric propulsion system includes a first electric machine mechanically coupled with the engine and configured to generate electrical power when driven by the engine. Moreover, the hybrid electric propulsion system includes a second electric machine electrically coupled with the first electric machine and configured to receive electrical power from the first electric machine. In addition, the hybrid electric propulsion system includes a second propulsion assembly mechanically coupled with the second electric machine and configured to produce thrust when driven by the second electric machine. The hybrid electric propulsion system also includes one or more sensing devices positioned onboard the aerial vehicle for detecting one or more performance indicators indicative of an electrical load on the engine. Moreover, the hybrid electric propulsion system includes one or more controllers communicatively coupled with the one or more sensors, the one or more controllers configured to: receive, from the one or more sensing devices, the one or more performance indicators indicative of the electrical load on the engine; determine whether an electrical load change is present based at least in part on the one or more performance indicators; and generate, if the electrical load change is present, a control action in response to the electrical load change.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 provides a flow diagram of an exemplary method in accordance with exemplary aspects of the present disclosure.

DETAILED DESCRIPTION

Figure 1:
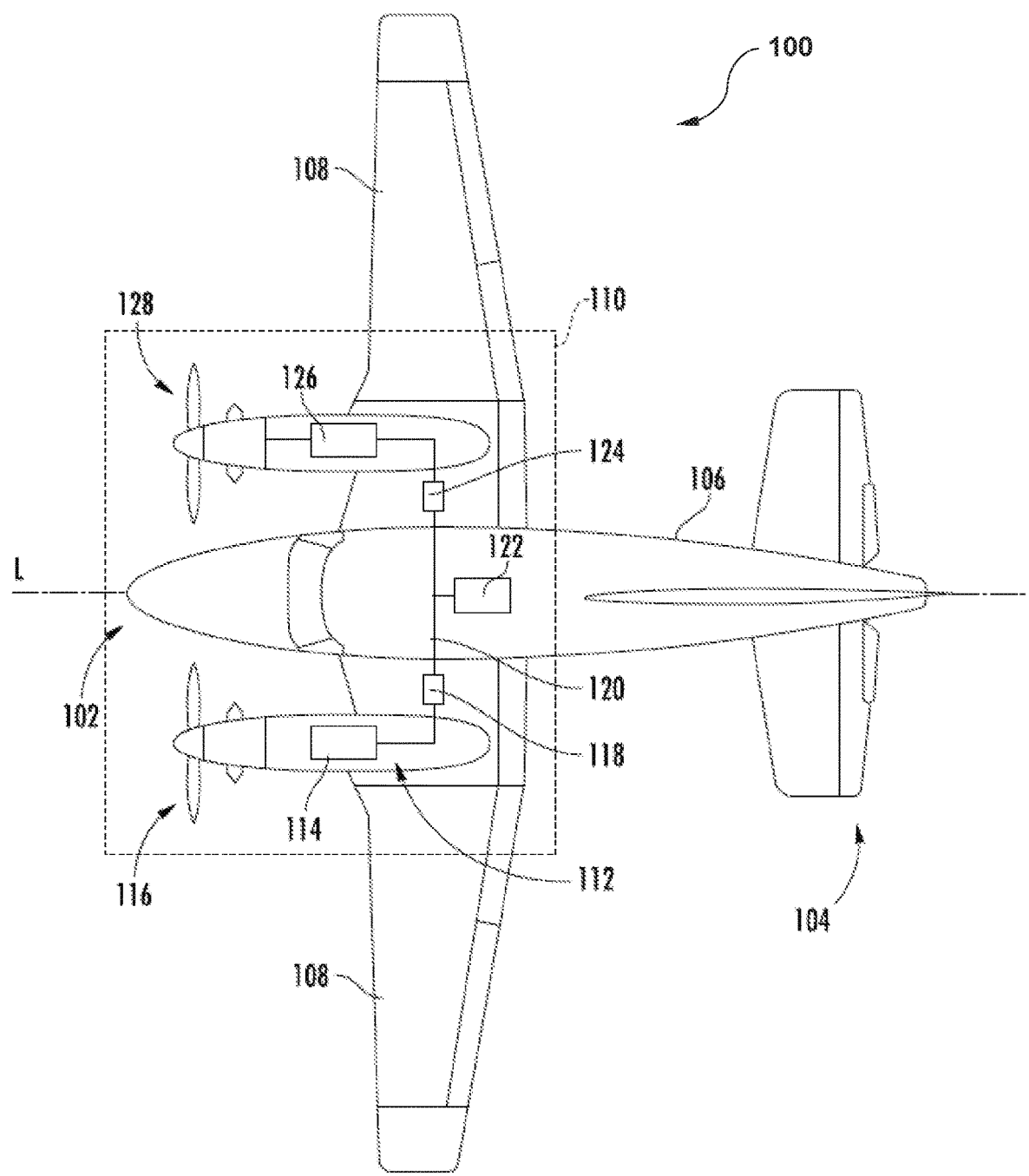
FIG. 1 provides a perspective schematic view of an exemplary aerial vehicle having a parallel hybrid electric propulsion system in accordance with exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. Furthermore, as used herein, terms of approximation, such as "approximately," "substantially," or "about," refer to being within a ten percent (10%) margin of error. Further, as used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

In general, the present disclosure is directed to a hybrid electric propulsion system and methods therefore. More particularly, the present disclosure is directed to control systems for hybrid electric propulsion systems for aerial vehicles that are configured for rapidly and automatically taking action in response to rapid electrical load changes on a torque source, such as an engine.

FIG. 1 provides a perspective schematic view of an exemplary aerial vehicle 100 having a hybrid electric propulsion system 110 in accordance with exemplary embodiments of the present disclosure. As shown, for this embodiment, the aerial vehicle 100 is a fixed-wing aircraft. In other embodiments, the aerial vehicle 100 may be other suitable types of aerial vehicles, such as a rotary aircraft, a vertical take-off and landing aircraft, tiltrotors, airships, unmanned aerial vehicles, etc. The aerial vehicle 100 extends between a first end 102 and a second end 104, e.g., along a longitudinal axis L. The first end 102 is a forward end of the aerial vehicle 100 and the second end 104 is a rear or aft end of the aerial vehicle 100 in the depicted embodiment of FIG. 1. The aerial vehicle 100 includes a fuselage 106 and a pair of wings 108 each extending laterally outward from the fuselage 106. The aerial vehicle may include various control surfaces for controlling propulsion and movement of the aerial vehicle 100. Example control surfaces include elevators, rudders, ailerons, spoilers, flaps, slats, air brakes, or trim devices, etc. Various actuators, servo motors, and other devices may be used to manipulate the various control surfaces and variable geometry components of the aerial vehicle 100. Moreover, as noted above, the aerial vehicle 100 includes the hybrid electric propulsion system 110 for producing thrust. More particularly, for this embodiment, the hybrid electric propulsion system 110 is a parallel hybrid electric propulsion system.

As depicted in FIG. 1, the hybrid electric propulsion system 110 includes an engine 112 mounted to one of the wings 108 of the aerial vehicle 100. The engine 112 may be any suitable aeromechanical torque source. For instance, the engine 112 is a gas turbine engine in the depicted embodiment. The gas turbine engine may be configured as a turboprop (as shown in FIG. 1), or other suitable types of gas turbine engines, e.g., turbofans, turbojets, turboshaft, etc. In alternative embodiments, the engine 112 may be a piston driven engine or some other type of internal combustion engine, such as a rocket engine.

A first electric machine 114 is mounted to one of wings 108 and is mechanically coupled with the engine 112. The first electric machine 114 is configured to generate electrical power when driven by the engine 112. To generate electrical power, as will be appreciated, the first electrical machine converts the rotational energy received from an output shaft of the engine 112 into electrical energy, which may be delivered to various components of the hybrid electric propulsion system 110 as described more fully below. Thus, the first electric machine 114 may serve as an electric generator. In some preferred embodiments, the first electric machine 114 may serve as a generator or a motor depending on the circumstances. A clutch 115 (FIG. 2) or like feature may be provided to disengage the first electric machine 114 from the engine 112, e.g., in the event of a complete failure of the first electric machine 114.

The hybrid electric propulsion system 110 also includes a first propulsion assembly 116 mechanically coupled with the engine 112 and configured to produce thrust when driven by the engine 112. For this embodiment, the first propulsion assembly 116 is a propeller or fan. The blades of the propeller may be adjustable in unison through a plurality of pitch angles, e.g., by activation of an actuation mechanism. Pitch adjustment of the blades may cause the propeller assembly to produce more or less thrust. In some embodiments, the first propulsion assembly 116 is mechanically coupled with the engine 112 in parallel with the first electric machine 114, e.g., to avoid single fault failures of the system. In alternative embodiments, the first propulsion assembly 116 is mechanically coupled with the engine 112 in series with the first electric machine 114. Some of the torque output from the engine 112 is directed to the first electric machine 114, e.g., for power generation, and some of the torque output is supplied to the first propulsion assembly 116, e.g., for propulsion of the aerial vehicle 100.

A first power converter 118 is electrically coupled with the first electric machine 114. The first power converter 118 provides an electronic interface between the first electric machine 114 and a power bus 120 of the propulsion system 110. As one example, the first power converter 118 may be a rectifier configured to convert the alternating current (AC) generated by the first electric machine 114 to direct current (DC). The first power converter 118 may be a passive system that includes a plurality of diodes or an active system that includes various processing devices, semiconductor switches and other electronic components.

An energy storage device 122 is electrically coupled with the first power converter 118, and thus the first electric machine 114. The energy storage device 122 may be embodied as, for example, one or more superconducting energy storage devices, batteries, or battery packs. The energy storage device 122 may be mounted within the fuselage 106 or in another suitable location. As will be explained in more detailed herein, energy storage device 122 may receive electrical power from first electric machine 114, and in some instances, may supply electrical power stored therein to various components of the propulsion system 110, such as e.g., the first electric machine 114, a second electric machine 126, and other loads.

A second power converter 124 is electrically coupled with the first power converter 118 and the energy storage device 122. The second power converter 124 is thus likewise also in electrical communication or electrically coupled with the first electric machine 114. The second power converter 124 provides the electronics to interface the second electric machine 126 with the power bus 120 of the propulsion system 110. As one example, the second power converter 124 may be an inverter configured to convert the DC current flowing through the power bus 120 to AC current, e.g., to control the speed or torque of the second electric machine 126.

The second electric machine 126 is electrically coupled with the first electric machine 114 and is configured to receive electrical power from the first electric machine 114 (e.g., directly, indirectly via the energy storage device 122, or both). Moreover, the second electric machine 126 is configured to convert the electrical power received from the first electric machine 114 into rotational energy, e.g., to rotate an output shaft of the second electric machine 126. Thus, the second electric machine 126 may serve as an electric motor. In some embodiments, the second electric machine 126 may serve as a motor or generator depending on the circumstances. The second power converter 124 may control the amount of electrical power delivered to the second electrical machine 126, e.g., to control the speed or torque output of the output shaft of the second electrical machine 126.

A second propulsion assembly 128 is mechanically coupled with the second electric machine 126, e.g., via a coupling of the output shaft and power gearbox of the second propulsion assembly 128. The second propulsion assembly 128 is configured to produce thrust when driven by the second electric machine 126. For this embodiment, like the first propulsion assembly 116, the second propulsion assembly 128 is a propeller or fan. The blades of the propeller may be adjustable in unison through a plurality of pitch angles, e.g., by activation of an actuation mechanism. Pitch adjustment of the blades may cause the propeller assembly to produce more or less thrust. In some embodiments, the hybrid electric propulsion system 110 may include multiple electric machines each coupled with one or more propulsion assemblies that are powered by the first electric machine 114. For instance, the hybrid electric propulsion system 110 may include a third electric machine that is electrically coupled with the first electric machine 114 and configured to receive electrical power therefrom. The third electric machine may be mechanically coupled with a third propulsion assembly for producing thrust. Further, the hybrid electric propulsion system 110 may include more electric machines and propulsion assemblies that are similarly configured as third electric machine and third propulsion assembly.

In some instances, the hybrid electric propulsion system 110 may experience thrust asymmetry or significant handling issues due to rapid electrical load changes, particularly during rapid electrical load drops or loss of electrical machine torque. For example, if the first electric machine 114 fails or drops offline due to a detected fault or other failure, the second electric machine 126 that relies on the first electric machine 114 for electrical power will cease producing an output torque to drive the second propulsion assembly 128 and the electrical load on the engine 112 will rapidly decrease or drop. Similarly, a sudden loss or failure of the second electric machine 126 will cause the load or counter torque on the first electrical machine 114 to rapidly drop to zero (0) and the electrical load on the engine 112 will rapidly decrease or drop. This may cause the first electric machine 114 and/or the engine 112 to overspeed. Further, in such instances, the thrust produced by the second propulsion assembly 128 will rapidly drop, and due to the removed electrical load on the first electric machine 114 and ultimately the engine 112, the thrust produced by the first propulsion assembly 116 rapidly increases due to the counter torque on the first electrical machine 114 dropping to zero (0) with the torque output of the engine 112 remaining unchanged. Accordingly, the result is thrust asymmetry. That is, thrust rapidly increases on one side of the aircraft while thrust rapidly drops on the other side. In accordance with exemplary aspects of the present disclosure, the hybrid electric propulsion system 110 includes a control system 130 (FIG. 2) that includes features that rapidly and automatically take action in the event of such rapid electrical load changes. In particular, the control system 130 of the hybrid electric propulsion system 110 is configured to rapidly and automatically account for electrical load changes on the order of microseconds while the engine 112 spools up or down to match the torque load of the electrical system on the engine 112. The engine 112 may take several seconds to spool up or down. Thus, the control system 130 is configured to take rapid and automatic action during this transient period. An exemplary control system is provided below.

Figure 2:
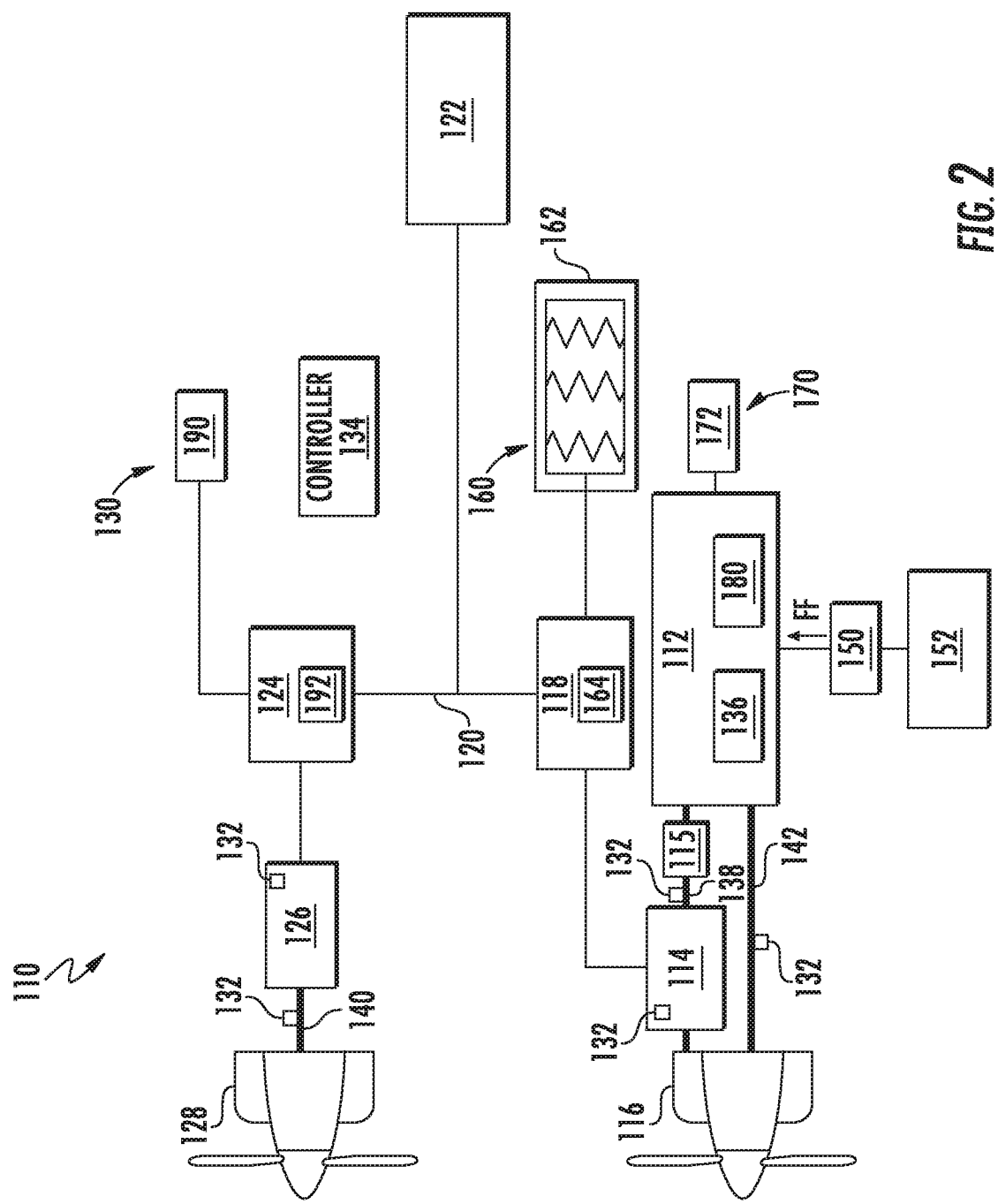
FIG. 2 provides a schematic view of an exemplary control system for the parallel hybrid electric propulsion system of the aerial vehicle of FIG. 1.

FIG. 2 provides a schematic view of the exemplary control system 130 for the hybrid electric propulsion system 110 of the aerial vehicle 100 of FIG. 1. As shown, the control system 130 includes one or more sensing devices 132 positioned onboard the aerial vehicle 100 for detecting one or more performance indicators indicative of an electrical load on the engine 112. For this embodiment, at least one sensing device 132 is positioned adjacent a shaft 138 mechanically coupling the engine 112 with the first electric machine 114, e.g., to sense or measure a performance indicator between the engine 112 and the first electric machine 114. The performance indicator may be an output torque of the engine 112 (or the input torque to the first electrical machine 114), the rotational speed of the shaft 138, or another suitable indicator. The performance indicator may be utilized to calculate, predict, or estimate the electrical load on the engine 112. Further, at least one sensing device 132 is positioned adjacent a shaft 140 mechanically coupling the second electric machine 126 with the second propulsion assembly 128, e.g., to sense or measure a performance indicator between the second electrical machine 126 and the second propulsion assembly 128. The performance indicator may be an output torque of the second electric machine 126

(or the input torque to the second propulsion assembly 128), the rotational speed of the shaft 140, or another suitable parameter.

Other sensing devices 132 may include current, voltage, or speed sensors configured to measure various parameters of the first electrical machine 114 and/or the second electrical machine 126. From such performance indicators, the electrical load or counter torque on the engine 112 may be calculated or estimated. Additionally, at least one sensing device 132 may be positioned adjacent to a shaft 142 mechanically coupling the engine 112 with the first propulsion assembly 116, e.g., to sense or measure a performance indicator between the engine 112 and the first propulsion assembly 116. The performance indicator may be an output torque of the engine 112 (or the input torque to the first propulsion assembly 116), the rotational speed of the shaft 142, or another suitable parameter. Like the other performance indicators, the performance indicator sensed or measured between the engine 112 and the first propulsion assembly 116 may be utilized to predict or estimate the electrical load on the engine 112.

The control system 130 also includes one or more controllers 134 configured to control the various components of the hybrid electric propulsion system 110. The one or more controllers 134 are communicatively coupled with various components of the hybrid electric propulsion system 110. For this embodiment, the one or more controllers 134 are communicatively coupled with the one or more sensors 132, the first electric machine 114, the second electric machine 126, the first power converter 118, the second power converter 124, the first propulsion assembly 116, the second propulsion assembly 128, the energy storage device 122, the clutch 115, and the engine 112, and more particularly, one or more engine controllers 136 configured to control the engine 112. The engine controller 136 may be, for example, an Electronic Engine Controller (EEC) or an Electronic Control Unit (ECU) equipped with Full Authority Digital Engine Control (FADEC). The engine controller 136 includes various components for performing various operations and functions, such as e.g., for controlling various variable geometry components and controlling a fuel flow to the combustor.

The one or more controllers 134 and one or more engine controllers 136 can each include one or more processor(s) and one or more memory device(s). The one or more processor(s) can include any suitable processing device, such as a microprocessor, microcontroller, integrated circuit, logic device, and/or other suitable processing device. The one or more memory device(s) can include one or more computer-readable media, including, but not limited to, non-transitory computer-readable media, RAM, ROM, hard drives, flash drives, and/or other memory devices.

The one or more memory device(s) can store information accessible by the one or more processor(s), including computer-readable instructions that can be executed by the one or more processor(s). The instructions can be any set of instructions that when executed by the one or more processor(s) cause the one or more processor(s) to perform operations. The instructions can be software written in any suitable programming language or can be implemented in hardware. Additionally, and/or alternatively, the instructions can be executed in logically and/or virtually separate threads on processor(s).

The memory device(s) can further store data that can be accessed by the one or more processor(s). For example, the data can include sensor data collected from the various sensing devices 132 of the hybrid electric propulsion system 110. Specifically, the data can include one or more performance indicators indicative of the electrical load on the first electric machine 114. The data can also include other data sets, parameters, outputs, information, etc. shown and/or described herein.

The one or more controllers 134 and engine controller 136 can each include a communication interface used to communicate, for example, with the other components of the aerial vehicle 100 and each other. The communication interface can include any suitable components for interfacing with one or more network(s), including for example, transmitters, receivers, ports, controllers, antennas, network interface components, and/or other suitable components. The one or more controllers 134 and one or more engine controllers 136 may be communicatively coupled with a communication network of the aerial vehicle 100. Communication network can include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the aerial vehicle 100 such as to a cloud computing environment and/or the off board computing systems. Such networking environments may use a wide variety of communication protocols. The communication network can include a data bus or a combination of wired and/or wireless communication links. The communication network can also be coupled to the one or more controllers 134, 136 by one or more communication cables or by wireless means.

As noted above, the one or more controllers 134 are configured to control the various components of the hybrid electric propulsion system 110 to take correction action when a rapid electrical load change on the engine 112 occurs. The rapid electrical load change may be a load decrease or a load increase. In the event of a load decrease, one or more electrical components of the hybrid electric propulsion system 110 may fail or otherwise be controlled to drop offline. For instance, the first electric machine 114 may fail, the second electric machine 126 may fail, etc. When this occurs, the electrical load on the engine 112 rapidly decreases, or stated another way, the torque countering the rotation of the output shaft of the engine 112 rapidly decreases. Such rapid changes may lead to a number of problems as noted previously, such as overspeed of the first electric machine 114, thrust asymmetry, etc. In the event of a load increase, the electrical power demanded by the power consuming devices or loads electrically coupled with the first electric machine 114 cannot be delivered by the first electric machine 114. That is, the demanded power is greater than the available power capable of being generated by the first electric machine 114. Exemplary manners in which the control system 130 may take correction action when a rapid electrical load change occurs are provided below.

In some embodiments, the one or more controllers 134 are configured to receive, from the one or more sensing devices 132, the one or more performance indicators indicative of the electrical load on the engine 112. For instance, the sensing device 132 positioned adjacent the shaft 138 mechanically coupling the engine 112 with the first electric machine 114 may sense a performance indicator indicative of the torque input to the first electric machine 114. Another sensing device 132 positioned adjacent the shaft 140 mechanically coupling the second electric machine 126 with the second propulsion assembly 128 may sense a performance indicator indicative of the torque output of the second electric machine 126. Based on these performance indicators, and potentially others, the one or more controllers 134 determine the electrical load on the engine 112.

Next, the one or more controllers 134 are configured to determine whether an electrical load change is present based at least in part on the one or more performance indicators. In some embodiments, the one or more controllers 134 are configured to determine an electrical load rate indicative of the electrical load on the engine 112 over a predetermined time interval based at least in part on the one or more performance indicators. Thereafter, the one or more controllers 134 are configured to compare the electrical load rate with a predetermined rate threshold. In such embodiments, if the electrical load rate exceeds the predetermined rate threshold, the one or more controllers 134 determine that the electrical load change is present. In other embodiments, the one of more controllers 134 are configured to receive, from power converters 118 and/or 124, status information indicative of a failure.

Figure 3:
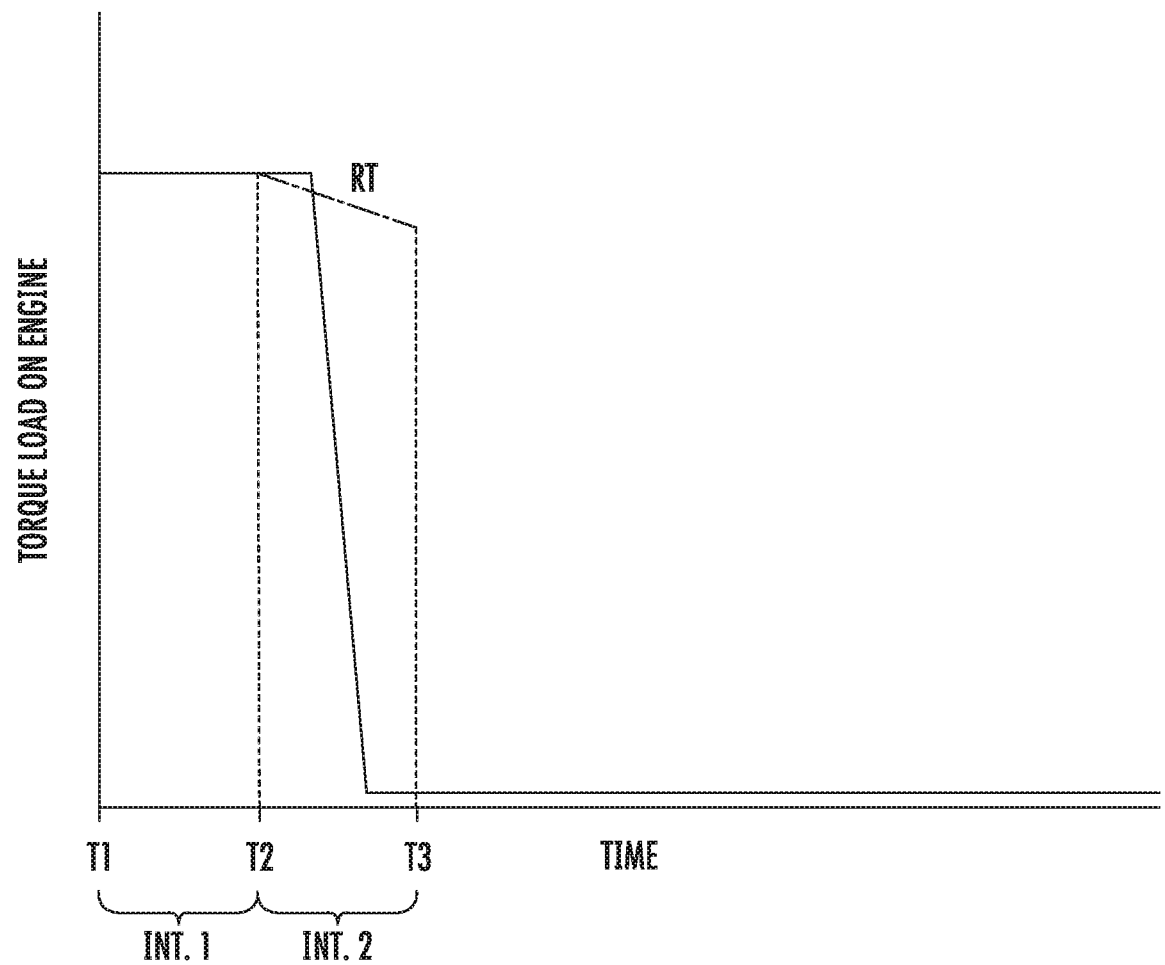
FIG. 3 provides a graph depicting the torque load on the engine as a function of time in accordance with exemplary embodiments of the present disclosure.

FIG. 3 provides a graph of a torque load on the engine as a function of time and depicts one example manner in which it may be determined whether an electrical load change is present based at least in part on the one or more performance indicators. As shown, for a first predetermined time interval Int. 1 spanning from time T1 to time T2, the one or more controllers 134 determine an electrical load rate indicative of the electrical load on the engine 112 based at least in part on the one or more performance indicators. The first predetermined time interval Int. 1 may be a single time step or multiple time steps of the one or more controllers 134, e.g., on the order of milliseconds or microseconds. In this example, the various torque inputs are provided to the controllers 134, and based on the torque inputs, the controllers 134 calculate the total electrical load on the engine 112. During the first predetermined time interval Int. 1, the electrical load on the engine 112 remained constant, and thus, no electrical load change on the engine 112 was present. Accordingly, the control system 130 need not take corrective action during the first predetermined time interval Int. 1.

For a second predetermined time interval Int. 2 spanning from time T2 to time T3, the one or more controllers 134 once again determine an electrical load rate indicative of the electrical load on the engine 112 based at least in part on the one or more performance indicators. The second predetermined time interval Int. 2 may span the same amount of time as the first predetermined time interval Int. 1. Based on the torque inputs, the controllers 134 calculate the total electrical load on the engine 112. During the second predetermined time interval Int. 2, the electrical load on the engine 112 decreases, and thus, a load decrease on the engine 112 is present. Thus, the one or more controllers 134 compare the electrical load rate with a predetermined rate threshold RT. For this embodiment, the predetermined rate threshold RT is set such that if the electrical load rate does not exceed the threshold, an electrical load decrease on the engine will not cause overspeed damage to the first electric machine 114 and any resulting thrust asymmetry will not cause a significant danger to the aerial vehicle 100. As shown in FIG. 3, the torque load decrease on the engine 112 exceeds the predetermined rate threshold RT (the rate of the torque load on the engine 112 decreases at a faster rate than permitted by the predetermined rate threshold RT). Accordingly, in this example, the one or more controllers 134 determine that there is an electrical load change present as the electrical load rate exceeds the predetermined rate threshold RT. It will be appreciated that other methods are possible for determining that an electrical load change is present. For example, determination can occur based on other performance parameters such as bus electrical power, engine/motor/propeller speed, or status indications provided by power converters 118 or 124.

Thereafter, the one or more controllers 134 are configured to generate, if the rapid electrical load change is present, a control action in response to the electrical load change. As will be explained further below, the appropriate control action response to the electrical load change on the engine 112 depends on whether the electrical load change is a load decrease (e.g., as shown in FIG. 3) or a load increase.

Referring again to FIG. 2, in the event of a load decrease or load drop, the one or more controllers 134 can generate a number of different control actions in accordance with exemplary aspects of the present disclosure. As one example, as shown in FIG. 2, the control system 130 includes a fuel control device 150 configured to selectively control a fuel flow FF to the engine 112. For instance, the fuel control device 150 may be positioned along a fuel line between a combustor assembly of the engine 112 and a fuel tank 152. The fuel control device 150 is communicatively coupled with the one or more controllers 134. Based on one or more controls signals from the one or more controllers 134, the fuel control device 150 may be moved between a closed position and an open position. The fuel control device 150 may be movable between an infinite number of open positions and the closed position, e.g., by use of proportional control valves, or may be switchable between a single open position and a closed position. If the electrical load change is a load decrease on the engine 112, in generating the control action the one or more controllers 134 are configured to activate the fuel control device 150 to reduce the fuel flow FF to the engine 112. For instance, the one or more controllers 134 may activate the fuel control device 150 to move to the closed position based on one or more control signals, e.g., to reduce the fuel flow FF to the engine 112. By reducing the fuel flow to the engine 112, the engine 112 output torque is decreased, allowing the engine output torque to drop to match the torque load (or the electrical load) on the engine 112 more rapidly.

In some embodiments, additionally or alternatively to reducing the fuel flow FF to the engine 112 via the fuel control device 150, the control system 130 includes an electrical braking system 160. For the depicted embodiment of FIG. 2, the electrical braking system 160 includes a load or resistor bank 162 comprised of a plurality of resistors and/or other dissipating elements. The resistor bank 162 may be positioned within the fuselage 106 or some other suitable location. The electrical braking system 160 also includes an electric switching device 164 for selectively electrically coupling the first electric machine 114 (or the DC Bus) and the resistor bank 162. For this embodiment, the electrical switching device 164 is positioned within the first power converter 118. In this way, the first power converter 118 may direct all, a portion, or some of the electrical power generated by the first electric machine 114 to the resistor bank 162.

In such embodiments, if the electrical load change is a load decrease on the engine 112, in generating the control action the one or more controllers are configured to activate the electric switching device 164 to electrically couple the first electric machine 114 and the resistor bank 162 for a transient time period to direct electrical power from the first electric machine 114 to the resistor bank 162. In this way, resistive electrical load on the engine 112 may be rapidly and automatically increased to accommodate the loss or drop in generator electrical load on the engine 112. Notably, the electrical switching device 164 may be switched nearly instantaneously (e.g., within microseconds) upon the controllers 134 determining that an electrical load decrease is present. Thus, excess electrical power generated by the first electric machine 114 may be dissipated via the resistor bank 162. This may, for example, prevent overspeed of the first electric machine 114 and reduce thrust asymmetry. Although the output torque of the second electric machine 126 may decrease a certain degree, the overall thrust asymmetry is reduced by transiently sinking electrical power from engine 112. Particularly, electrical power may be directed to the resistor bank 162 for a transient time period, which may be a time sufficient for the engine 112 to reduce its torque output to match the torque load of the electrical system on the engine 112. For instance, the transient time period may be several seconds.

In yet other embodiments, additionally or alternatively to reducing the fuel flow FF to the engine 112 via the fuel control device 150, the control system 130 includes a physical braking system 170 mechanically coupled with the engine 112. For the depicted embodiment of FIG. 2, the physical braking system 170 includes a disc brake 172 mechanically coupled with the engine 112. Although the disc brake 172 is shown positioned rear or aft of the engine 112 in FIG. 2, the disc brake 172 may be positioned in other suitable locations so long as the disc brake 172 is mechanically coupled with the engine 112. For instance, the disc brake 172 may be positioned forward of the engine 112, e.g., between the engine 112 and the first electric machine 114. In such embodiments, if the rapid electrical load change is a load decrease on the engine 112, in generating the control action the one or more controllers are configured to activate the physical braking system 170 to reduce a torque output of the engine 112 for a transient time period. By applying a load on the engine 112 via the physical braking system 170, the engine 112 output torque is decreased, allowing the engine output torque to drop to match the torque load (or the electrical load) on the engine 112 more rapidly. Further, the physical braking system 170 may prevent overspeed of the engine 112 and/or the first electric machine 114.

In some further embodiments, additionally or alternatively to reducing the fuel flow FF to the engine 112 via the fuel control device 150, the energy storage device 122 electrically coupled with the first electric machine 114 may be utilized by the control system 130 to account for rapid electrical load changes. In some embodiments, if the rapid electrical load change is a load decrease on the engine, the energy storage device 122 is configured to receive an amount of excess electrical power from the first electric machine 114 for a transient time period. The transient time period may be a time sufficient for the engine 112 to reduce its torque output to match the torque load of the electrical system on the engine 112. The first power converter 118 may include a switching element that directs all, a portion, or some of the electrical power generated by the first electric machine 114 to the energy storage device 122. For instance, some of the electrical power may be directed to the electrical braking system 160 and some of the electrical power may be directed to the energy storage device 122. In other embodiments, a switching element may be positioned along the power bus 120 for selectively directed excess electrical power to the energy storage device 122.

In yet further embodiments, additionally or alternatively to reducing the fuel flow FF to the engine 112 via the fuel control device 150, the control system 130 may utilize one or more variable geometry components 180 of the engine 112 to account for rapid electrical load changes, e.g., by reducing the torque output of the engine 112. The one or more variable geometry components 180 of the engine 112 may include variable guide vanes, such as variable inlet guide vanes and variable outlet guide vanes, as well as other variable airfoil surfaces that alter or affect the mass flow through a gas path of the engine. Other variable geometry components may include bleed valves, one or more High Pressure Turbine Active Clearance Control (HPTACC) valves, Low Pressure Turbine Active Clearance Control (LPTACC) valves, Core Compartment Cooling (CCC) valves, Booster Anti-Ice (BAI) valves, Nacelle Anti-Ice (NAI) valves, Start Bleed Valves (SBV), Transient Bleed Valves (TBV), Modulated Turbine Cooling (MTC) valves and/or combined valves. In such embodiments, if the rapid electrical load change is a load decrease on the engine 112, the one or more controllers 134 are configured to activate one or more variable geometry components 180 of the engine 112 so that the engine 112 is operated in a less efficient manner for a transient time period.

For instance, upon determining that a rapid load decrease has occurred, the one or more controllers 134 may communicate with the one or more engine controllers 136, e.g., to instruct the one or more engine controllers 136 to actuate one or more of the variable geometry components 180 of the engine 112 in a less efficient manner. By operating the engine 112 in a less efficient manner, the torque output of the engine 112 will decrease, and accordingly, the torque output of the engine 112 will decrease more rapidly so that it more rapidly matches the torque load on the engine 112. The transient time period may be a time sufficient for the engine 112 to reduce its torque output to match the torque load of the electrical system on the engine 112. When the torque output of the engine 112 matches the torque load of the electrical system on the engine 112, the one or more controllers 134 may communicate with the engine controllers 136 to control the one or more variable geometry components 180 to operate in a more efficient manner, e.g., to increase the efficiency of the engine 112.

In yet other embodiments, additionally or alternatively to reducing the fuel flow FF to the engine 112 via the fuel control device 150, the control system 130 may utilize one or more of the propulsion assemblies 116, 128 to account for rapid electrical load changes, e.g., by reducing the torque load on the engine 112. In such embodiments, if the rapid electrical load change is a load decrease on the engine 112, the one or more controllers 134 are configured to control the first propulsion assembly 116, the second propulsion assembly 128, some other propulsion assembly mechanically coupled with an electric machine of the electrical system, or some combination thereof in a less efficient manner for a transient time period. For instance, in some embodiments, the first propulsion assembly 116 and the second propulsion assembly 128 are variable pitch propeller assemblies each having a plurality of blades adjustable in unison through a plurality of pitch or blade angles, e.g., by activation of an actuation mechanism. Pitch adjustment of the blades may cause the propeller assemblies to produce more or less thrust. In the event of a load decrease on the engine 112, the controllers 134 may communicate directly or indirectly with the activation mechanism of the propulsion assemblies 116, 128 to pitch the blades to a more coarse or flat angle. In this manner, the torque load on the engine 112 may be increased and thus some of the excess torque output from the engine 112 may be accounted for by the propulsion assemblies 116, 128. Advantageously, adjustment of one or more propulsion assemblies may prevent engine/electric machine overspeed.

In some embodiments, additionally or alternatively to reducing the fuel flow FF to the engine 112 via the fuel control device 150, the control system 130 may decrease the efficiency of the first electric machine 114, the second electric machine 126, or some other power consuming device or load electrically coupled with the first electric machine 114 to account for the drop in electrical load on the engine 112. In such embodiments, if the rapid electrical load change is a load decrease on the engine 112, the one or more controllers 134 are configured to control at least one of the first electric machine 114, the second electric machine 126, other power consuming devices electrically coupled with the first electrical machine 114 (e.g., power converters 118, 124, other electric machines, etc.), or some combination thereof to operate in a less efficient manner for a transient time period. In this manner, the transient excess power produced by the first electric machine 114 may be dissipated as heat via one or more of the electric machines or power consuming devices electrically coupled with the first electric machine 114. By way of example, the phase or current advance angle, the amplitude of phase current, or some other parameter know to affect the efficiency of one or more of the electric machines may be controlled to operate one or more of the electric machines in a reduced-efficiency mode during the excess power transient. The transient time period may be a time sufficient for the engine 112 to reduce its torque output to match the torque load of the electrical system on the engine 112. By operating the first electric machine 114, the second electric machine 16, or some other power consuming device or load in a less efficient or high-power manner, an electrical load may be placed on the engine 112 to account for the load decrease. Such transient electrical load may be placed on the engine 112 nearly instantaneously (e.g., within microseconds of a determination that there is a load decrease on the engine 112).

In some embodiments, the first electrical machine 114 is an electric generator (e.g., 204 of FIG. 4) and the second electric machine 126 is an electric motor (e.g., 206 of FIG. 4) electrically coupled with the electric generator 204. If the rapid electrical load change is a load decrease on the engine 112 (or 202 of FIG. 4), the one or more controllers 134 (or 220 of FIG. 4) are further configured to control at least one of a power consuming device 206 which is an electric motor or other power consuming loads (which may also be electric motors) to operate in a less efficient or high-power manner.

In some embodiments, additionally or alternatively to reducing the fuel flow FF to the engine 112 via the fuel control device 150, the control system 130 may direct transient excess electrical power to one or more accessory loads 190 of the aerial vehicle 100 (FIG. 1). Example accessory loads 190 may include an air conditioning unit of the aerial vehicle 100, pumps or fans, displays, data processing units, communication units, other sub-systems, some combination thereof, etc. The control system 130 of the hybrid electric propulsion system 110 includes an electric switching device 192 for selectively electrically coupling the first electric machine 114 and the one or more accessory loads 190 of the aerial vehicle 100. For this embodiment, the electrical switching device 192 is positioned within the second power converter 124. In this way, the second power converter 124 may direct all, a portion, or some of the electrical power generated by the first electric machine 114 to the one or more accessory loads 190, e.g., as AC current. In such embodiments, if the rapid electrical load change is a load decrease on the engine 112, the one or more controllers 134 are configured to activate the electric switching device 192 to electrically couple the first electric machine 114 and the one or more accessory loads 190 for a transient time period to direct electrical power from the first electric machine 114 to the one or more accessory loads 190. By utilizing the accessories 190 of the aerial vehicle 100 to increase the electrical load on the engine 112 during the transient time period, the engine 112 may more rapidly match its torque output to the torque load of the electrical system on the engine 112. It will be appreciated that electrical switching device 192 may be positioned in other suitable locations of the electrical system and that power switching and routing can be accomplished in any suitable fashion and in any suitable physical locations.

In the event of a load increase, the one or more controllers 134 can generate a number of different control actions in accordance with exemplary aspects of the present disclosure. Whether a load increase is present may be determined by the one or more controllers 134, e.g., by determining an electrical load rate indicative of the electrical load on the engine 112 over a predetermined time interval based at least in part on the one or more performance indicators and then comparing the electrical load rate with a predetermined rate threshold. In such embodiments, if the electrical load rate exceeds the predetermined rate threshold (e.g., by having a greater slope than the slope of the predetermined threshold slope), the one or more controllers 134 determine that the electrical load change is present, and particularly, that a load increase is present. It will be appreciated that other suitable methods are possible for determining that an electrical load change is present. For example, determination can occur based on other performance parameters such as bus electrical power, engine/motor/propeller speed, or status indications provided by power converters 118 or 124.

In some embodiments, if the rapid electrical load change is a load increase on the engine 112 and the load increase is caused by a failure of the first electric machine 114, the one or more controllers 134 are configured to control the delivery of electrical power from the energy storage device 122 to the second electric machine 126 for a transient time period. In this way, despite the failure of the first electric machine 114, electrical power may still be delivered to the second electric machine 126 so that the second electric machine 126 may drive the second propulsion assembly 128. Thus, thrust asymmetry is reduced or eliminated.

In other embodiments, if the rapid electrical load change is a load increase on the engine 112 and the load increase is intentionally demanded, the one or more controllers 134 are likewise configured to control the delivery of electrical power from the energy storage device 122 to the second electric machine 126 for a transient time period. For instance, if the electrical power demanded and consumed by second electric machine 126 to drive the second propulsion assembly 128 spikes (e.g., during a vertical takeoff or landing, a hover maneuver, etc.), causing the electrical load on the engine 112 to rapidly increase, the one or more controllers 134 control the energy storage device 122 to deliver electrical power to the second electric machine 126 for a transient time period to achieve the desired power demand. In this way, the control system 130 may facilitate meeting the power demanded by the electrical system of the hybrid electric propulsion system 110.

Further, in some embodiments, the first electric machine 114 may be mechanically coupled with the first propulsion assembly 116 (e.g., as shown in FIG. 2). The first electric machine 114 may be directly mechanically coupled with the first propulsion assembly 116 or an additional clutch (not shown) may be provided therebetween to disengage the first electric machine 114 from the first propulsion assembly 116.

In the event of a catastrophic failure of the engine 112, clutch 115 may be controlled to disengage the first electric machine 114 from the engine 112, and first electric machine 114 may receive electrical power from the energy storage device 122. The first electric machine 114, acting as an electric motor, may drive the first propulsion assembly 116. Accordingly, in some embodiments, the hybrid electric propulsion system 110 may switch to a fully electric system.

Moreover, in some instances, the first electric machine 114 may fail. Upon a failure of the first electric machine 114, the amount of electrical power going to the second electric machine 126 decreases while the torque load on the engine 112 also decreases. In some embodiments, the electrical power shortfall to second electric machine 126 can be compensated-for by sourcing power from energy storage device 122. Other methods, already addressed, can be utilized to prevent overspeed of engine 112 and first propulsion assembly 116.

Figure 4:
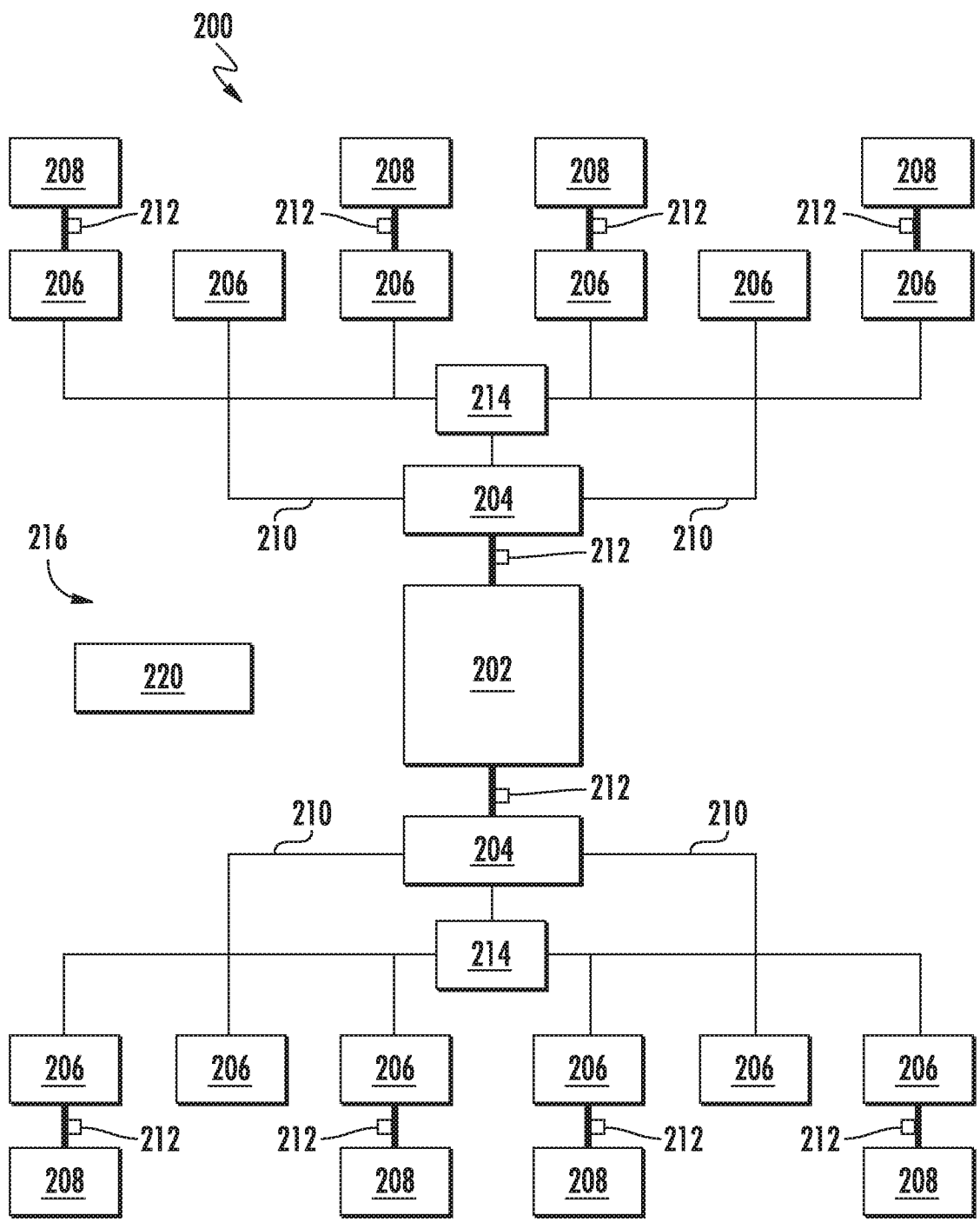
FIG. 4 provides a schematic view of another exemplary hybrid electric propulsion system in accordance with exemplary embodiments of the present disclosure.

FIG. 4 provides a schematic view of another exemplary hybrid electric propulsion system 200 for an aerial vehicle in accordance with exemplary embodiments of the present disclosure. The hybrid electric propulsion system 200 of FIG. 4 is configured for driving propulsion and supplying electrical power to any suitable aerial vehicle, such as e.g., an unmanned aerial vehicle configured for vertical take-off and landing and hovering maneuvers. The exemplary hybrid electric propulsion system 200 of FIG. 4 is configured in a similar manner as the hybrid electric propulsion system 110 of FIGS. 1 and 2 except as noted below.

In contrast with the hybrid electric propulsion system 110 of FIGS. 1 and 2, the hybrid electric propulsion system 200 of FIG. 4 includes a torque source or engine 202 that is not mechanically coupled with a propulsion assembly. Rather, for this embodiment, the engine 202 is configured to drive one or more electric generators 204. More particularly, the engine 202 is configured to drive a pair of electric generators 204 each mechanically coupled with the engine 202. Like the first electric machine 114 of FIGS. 1 and 2, the electric generators 204 are configured to generate electrical power when driven by the engine 202. In some alternative embodiments, the hybrid electric propulsion system 200 may include one electric generator or more than two (2) electric generators.

As further shown in FIG. 4, a plurality of power consuming devices 206 are electrically coupled with the electric generators 204 via power buses 210. For this embodiment, the power consuming devices 206 include a plurality of electric motors configured to receive electrical power from one of the electric generators 204 and generate an output torque to drive a propulsion assembly 208 mechanically coupled thereto. The propulsion assemblies 208 may be fans, rotors, or another suitable propulsion device, for example. Moreover, for this embodiment, some of the power consuming devices 206 are powered by the electric generators 204 but are not mechanically coupled with propulsion assemblies 208. For instance, such power consuming devices 206 may power a display, a controller 220 of the hybrid electric propulsion system 200, avionics systems, etc. Energy storage devices 214 are also electrically coupled with the electric generators 204 and the power consuming devices 206, e.g., to receive electrical power therefrom and deliver electrical power thereto. Although not shown, various power converters may be included in the hybrid electric system 200, e.g., to convert the generated electrical power into desired form.

A plurality of sensing devices 212 are positioned to detect one or more performance indicators indicative of the electrical load or torque load on the engine 202. As one example, one or more of the sensing devices 212 may be speed sensors configured to sense the rotational speed of the shaft or rotation component that they are positioned proximate. As another example, one or more of the sensing devices 212 may be torque sensors configured to measure the torque of the shaft or rotational component that they are positioned proximate. As yet another example, one or more of the sensing devices 212 may be configured to measure or sense an electrical parameter indicative of the torque load on the engine 112, such as the current flowing through one of the electric machines, the voltage across the machine, or some other parameter. Such performance indicators may be routed to the controller 220, which may be a plurality of controllers or a single controller, so that the torque load or electrical load on the engine 202 may be calculated or estimated. In accordance with the exemplary aspects disclosed herein, the hybrid electric propulsion system 200 includes a control system 216 configured to take rapid and automatic corrective action in the event of a rapid electric load change on the engine 202, e.g., in a similar as noted above with respect to the control system 130 of the hybrid electric system 110 of FIGS. 1 and 2. For instance, the controller 220 of the control system 216 may control the various components of the hybrid electric propulsion system 200 in the same or similar manner as noted above. Some or all of the components noted above with respect to the control system 130 of the hybrid electric system 110 of FIGS. 1 and 2 may be incorporated into the control system 216 of the hybrid electric propulsion system 200.

FIG. 5 provides a flow diagram of an exemplary method (300) for operating a hybrid electric propulsion system for an aerial vehicle. For instance, the hybrid electric propulsion system and the aerial vehicle may be the hybrid electric propulsion system 110 and the aerial vehicle may be the aerial vehicle 100 of FIGS. 1 and 2. Method (300) is also applicable to the hybrid electric propulsion system 200 of FIG. 4. For context, reference numerals utilized to describe the hybrid electric propulsion system 110 and the aerial vehicle 100 noted above and their various features will be utilized below.

At (302), the method (300) includes receiving, from one or more sensing devices positioned onboard the aerial vehicle, one or more performance indicators indicative of an electrical load on the engine, the engine mechanically coupled with an electric machine configured to generate electrical power when driven by the engine, the electric machine electrically coupled with one or more power consuming devices, wherein at least one of the one or more power consuming devices are mechanically coupled with a propulsion assembly. For instance, the sensing devices 132 positioned onboard the aerial vehicle 100 may sense one or more performance indicators indicative of the electrical load on the engine 112. The performance indicators may be torque or speed of a rotational component, an electrical parameter of an electric machine or power consuming device (e.g., current, voltage, etc.), or some other indicator of the electrical load or torque load on the engine 112. Some signals or measurements may then be routed to the one or more controllers 134 for processing. In this way, the electrical load on the engine 112 may be determined. A combination of measurements and estimates may be used to calculate the electrical load on the engine 112.

At (304), the method (300) includes determining whether an electrical load decrease on the engine is present based at least in part on the one or more performance indicators. For instance, in some implementations, the one or more controllers 134 are configured to determine an electrical load rate indicative of the electrical load on the engine 112 over a predetermined time interval based at least in part on the one or more performance indicators. Thereafter, the one or more controllers 134 are configured to compare the electrical load rate with a predetermined rate threshold. In such embodiments, if the electrical load rate exceeds the predetermined rate threshold, the one or more controllers 134 determine that the electrical load change is present. FIG. 3 and the accompanying text illustrate one exemplary manner in which it may be determined whether a rapid electrical load decrease is present. In some further implementations, the torque demanded by the electrical system on the engine 112 may also be considered. Thus, in addition to checking if the electrical load decrease is present based on comparing the electrical load on the engine 112 and the predetermined rate threshold, the demanded torque of the system may be utilized to determine whether an electrical load decrease is present.

At (306), the method (300) includes generating, if the electrical load decrease on the engine is present, a control action in response to the electrical load decrease, wherein generating the control action comprises reducing a fuel flow to the engine. For instance, as noted previously, the control system 130 of the hybrid electric propulsion system 110 may include a fuel cutoff or fuel control device 150 configured to selectively control fuel flow FF to the engine 112 (e.g., as shown in FIG. 2). In the event a load decrease is determined to be present, the controllers 134 communicatively coupled with the fuel control device 150 active the fuel control device 150 to move to toward the closed position to cut off fuel flow FF to the engine 112. By reducing the fuel flow to the engine 112, the engine 112 output torque is decreased, allowing the engine output torque to drop more rapidly to match the torque load (or the electrical load) on the engine 112.

In some implementations of method (300), the control action further includes delivering an amount of excess electrical power from the electric machine to an electrical braking system for a transient time period. For instance, in some implementations, the control system 130 includes the electrical braking system 160 of FIG. 2, which includes resistor bank 162 comprised of a plurality of resistors and/or other dissipating elements. The electrical braking system 160 also includes electric switching device 164 for selectively electrically coupling the first electric machine 114 and the resistor bank 162. In the event a load decrease is determined to be present, the controllers 134 communicatively coupled with the electric switching device 164 activate the electric switching device 164 to electrically couple the electric machine and the resistor bank 162 for a transient time period to direct electrical power from the electric machine to the resistor bank 162. In this way, the electrical load on the engine 112 may be rapidly and automatically increased to accommodate the loss or drop in electrical load on the engine 112. Thus, excess electrical power generated by the electric machine may be dissipated via the resistor bank 162. The transient time period that the resistor bank 162 receives electrical power may be time in which the engine 112 spools down to match its output torque to the electrical load on the engine 112.

In some implementations of method (300), the control action further includes delivering an amount of excess electrical power from the electric machine to one or more accessory loads of the aerial vehicle for a transient time period. For instance, in some implementations as shown in FIG. 2, one or more accessory loads 190 are electrically coupled with the electric machine, which may be the first electric machine 114 of the hybrid electric propulsion system 110 of FIG. 2, for example. Accessory loads could be any power consuming load of the aerial vehicle 100 (FIG. 1). Example accessory loads 190 may include an air conditioning unit of the aerial vehicle 100, pumps or fans, displays, data processing units, communication units, other sub-systems, some combination thereof, etc. In some embodiments, a power management device is electrically coupled with the electric machine and is configured to selectively distribute the excess loads to the accessory loads 190 of the aerial vehicle 100. In the event a load decrease is determined to be present, the controllers 134 communicatively coupled with the power management device may direct the power management device to distribute the excess electrical power to the one or more accessory loads 190 of the aerial vehicle 100. In this way, the electrical load on the engine 112 may be rapidly and automatically increased to accommodate the loss or drop in electrical load on the engine 112. The transient time period that the accessory loads 190 receive electrical power may a time period in which the engine 112 spools down to match its output torque to the electrical load on the engine 112.

In some implementations of method (300), the control action further includes controlling one or more variable geometry components of the engine to move such that the engine is operated in a less efficient manner for a transient time period. For instance, in some implementations as shown in FIG. 2, the engine 112 may include one or more variable geometry components 180, such as e.g., variable guide vanes positioned along one or more gas paths of the engine 112. In such implementations, upon determining that a rapid load decrease on the engine 112 has occurred at (304), based on one or more command signals from the controllers 134, the one or more engine controllers 136 control one or more variable geometry components 180 of the engine 112 to actuate or move such that the engine 112 is operated in a less efficient manner for a transient time period. For instance, inlet guide vanes of a compressor of a gas turbine engine may be moved such that the vanes impart a less efficient whirling motion to airflow passing across the vanes, thereby reducing the torque output of the engine more rapidly. As noted previously, by operating the engine 112 in a less efficient manner, the torque output of the engine 112 will decrease, and accordingly, the torque output of the engine 112 will decrease more rapidly so that it more rapidly matches the torque load on the engine 112. The transient time period may be a time sufficient for the engine 112 to reduce its torque output to match the torque load of the electrical system on the engine 112.

In some implementations of method (300), the control action further includes controlling the electric machine and/or at least one of the one or more power consuming devices or loads to operate in a less efficient or high-power manner for a transient time period. For instance, the electric machine may be the first electric machine 114 of FIGS. 1 and 2 and the power consuming devices may include the second electric machine 126 and other loads. In the event a load decrease is determined to be present, the one or more controllers 134 control at least one of the first electric machine 114, the second electric machine 126, other power consuming devices electrically coupled with the first electrical machine 114 (e.g., power converters 118, 124, other electric machines, etc.), or some combination thereof to operate in a less efficient or high-power manner for a transient time period. In this manner, the excess power produced during the transient period by the first electric machine 114 may be dissipated as heat via one or more of the electric machines or power consuming devices electrically coupled with the first electric machine 114. The transient time period may be a time sufficient for the engine 112 to reduce its torque output to match the torque load of the electrical system on the engine 112.

In some further implementations of method (300), the control action further includes controlling the propulsion assembly in a less efficient manner for a transient time period. For instance, the propulsion assembly may be the first propulsion assembly 116 of FIGS. 1 and 2. In the event a load decrease is determined to be present, the one or more controllers 134 may control the first propulsion assembly to operate less efficiently, e.g., by adjusting the pitch of the blades to a more coarse or flat angle (i.e., an angle opposite the feathering angle). In this manner, the torque load on the engine 112 may be increased and thus some of the excess torque output from the engine 112 may be accounted for by the propulsion assemblies 116. Of course, more than one propulsion assembly may be operated less efficiently at one time, such as in the case of the propulsion assemblies 208 of FIG. 4. Advantageously, adjustment of one or more propulsion assemblies may prevent engine/electric machine overspeed.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hybrid electric propulsion system for an aerial vehicle, the hybrid electric propulsion system comprising:
    an engine;
    a first electric machine mechanically coupled with the engine and configured to generate electrical power when driven by the engine;
    one or more power consuming loads electrically coupled with the first electric machine and configured to receive electrical power from the first electric machine, the one or more power consuming loads comprising a second electric machine, wherein the second electric machine comprises an electric motor;
    a propulsion assembly mechanically coupled with the second electric machine and configured to produce thrust when driven by the second electric machine;
    one or more sensing devices positioned onboard the aerial vehicle for detecting one or more performance indicators indicative of an electrical load on the engine;
    a fuel control device configured to selectively control a fuel flow to the engine;
    one or more controllers communicatively coupled with the one or more sensors, the one or more controllers configured to:
        receive, from the one or more sensing devices, the one or more performance indicators indicative of the electrical load on the engine;
        determine, based at least in part on the one or more performance indicators, an occurrence of an electrical load change indicating a thrust asymmetry; and
        generate, responsive to the occurrence of the electrical load change, a control action comprising (i) activating the fuel control device to reduce the fuel flow to the engine and (ii) controlling the electric motor in a manner that decreases an efficiency of the electric motor;
        wherein the control action reduces the thrust asymmetry by changing a delivery of electrical power within the hybrid electric propulsion system for a transient time period sufficient for the engine to reduce a torque output of the engine to match an electrical load on the engine.

2. The hybrid electric propulsion system of claim 1, further comprising:
    a physical braking system mechanically coupled with the engine, and wherein if the electrical load change is a load decrease on the engine, in generating the control action the one or more controllers are configured to:
    activate the physical braking system to reduce a torque output of the engine.

3. The hybrid electric propulsion system of claim 1, further comprising:
    an energy storage device electrically coupled with the first electric machine and electrically coupled with the second electric machine, and wherein if the electrical load change is a load decrease on the engine, the energy storage device is configured to receive an amount of excess electrical power from the first electric machine.

4. The hybrid electric propulsion system of claim 1, wherein if the electrical load change is a load decrease on the engine, the one or more controllers are further configured to:
    activate one or more variable geometry components of the engine so that the engine is operated in a manner which reduces a torque output of the engine.

5. The hybrid electric propulsion system of claim 1, wherein the first electric machine is an electric generator and the second electric machine is electrically coupled with the electric generator.

6. The hybrid electric propulsion system of claim 1, wherein the aerial vehicle comprises one or more accessory loads, and wherein the hybrid electric propulsion system further comprises:
    an electric switching device for selectively electrically coupling the first electric machine and the one or more accessory loads, and wherein if the electrical load change is a load decrease on the engine, the one or more controllers are further configured to:
    activate the electric switching device to electrically couple the first electric machine and the one or more accessory loads to direct electrical power from the first electric machine to the one or more accessory loads.

7. The hybrid electric propulsion system of claim 1, wherein if the electrical load change is a load increase on the engine, the one or more controllers are further configured to:
    control an energy storage device to deliver electrical power to the second electric machine for a transient time period.

8. The hybrid electric propulsion system of claim 1, wherein controlling the delivery of electrical power within the hybrid electric propulsion system comprises:

controlling the delivery of electrical power from an energy storage device to the second electric machine.

9. A method for operating a hybrid electric propulsion system for an aerial vehicle, the method comprising:
receiving, from one or more sensing devices positioned onboard the aerial vehicle, one or more performance indicators indicative of an electrical load on the engine, the engine mechanically coupled with an electric machine configured to generate electrical power when driven by the engine, the electric machine electrically coupled with one or more power consuming devices, wherein the electric machine is an electric motor, and wherein at least one of the one or more power consuming devices are mechanically coupled with a propulsion assembly;
determining, based at least in part on the one or more performance indicators, an occurrence of an electrical load change indicating a thrust asymmetry as between a first side of the aerial vehicle and a second side of the aerial vehicle; and
generating, responsive to the occurrence of the electrical load change, a control action comprising (i) reducing a fuel flow to the engine and (ii) controlling the electric motor in a manner that decreases an efficiency of the electric motor;
wherein the control action reduces the thrust asymmetry by changing a delivery of electrical power within the hybrid electric propulsion system for a transient time period sufficient for the engine to reduce a torque output of the engine to match an electrical load on the engine.

10. The method of claim 9, wherein the control action further comprises:
delivering an amount of excess electrical power from the electric machine to an electrical braking system.

11. The method of claim 9, wherein the control action further comprises:
delivering an amount of excess electrical power from the electric machine to one or more accessory loads of the aerial vehicle.

12. The method of claim 9, wherein the control action further comprises:
controlling one or more variable geometry components of the engine to move such that the engine is operated in a manner which reduces a torque output of the engine.

13. The method of claim 9, wherein the control action further comprises:
controlling the electric machine or at least one of the one or more power consuming devices to operate in a manner which reduces a torque output of the engine.

14. The method of claim 9, wherein the control action further comprises:
controlling the propulsion assembly in a manner which reduces a torque output of the engine for a transient time period.

15. The method of claim 9, wherein changing a delivery of electrical power within the hybrid electric propulsion system comprises transiently sinking electrical power from the engine while delivering electrical power from an energy storage device to the electric machine.

16. A hybrid electric propulsion system for an aerial vehicle, the hybrid electric propulsion system comprising:
an engine;
a first propulsion assembly mechanically coupled with the engine and configured to produce thrust when driven by the engine;
a first electric machine mechanically coupled with the engine and configured to generate electrical power when driven by the engine wherein the first electric machine comprises a first electric motor;
a second electric machine electrically coupled with the first electric machine and configured to receive electrical power from the first electric machine, wherein the second electric machine comprises a second electric motor;
a second propulsion assembly mechanically coupled with the second electric machine and configured to produce thrust when driven by the second electric machine;
one or more sensing devices positioned onboard the aerial vehicle for detecting one or more performance indicators indicative of an electrical load on the engine;
a fuel control device configured to selectively control a fuel flow to the engine;
an electrical braking system comprising a resistor bank and an electric switching device for selectively electrically coupling the first electric machine and the resistor bank; and
one or more controllers communicatively coupled with the one or more sensors, the one or more controllers configured to:
receive, from the one or more sensing devices, the one or more performance indicators indicative of the electrical load on the engine;
determine, based at least in part on the one or more performance indicators, an occurrence of an electrical load change indicating a thrust asymmetry as between the first propulsion assembly and the second propulsion assembly; and
generate, responsive to the occurrence of the electrical load change, a control action comprising (i) activating the fuel control device to reduce the fuel flow to the engine and (ii) controlling at least one of: the first electric motor in a manner that decreases an efficiency of the first electric motor, and the second electric motor in a manner that decreases an efficiency of the second electric motor;
wherein the control action reduces the thrust asymmetry by changing a delivery of electrical power within the hybrid electric propulsion system for a transient time period sufficient for the engine to reduce a torque output of the engine to match an electrical load on the engine.

17. The hybrid electric propulsion system of claim 16, further comprising:
an energy storage device electrically coupled with the second electric machine, and wherein if the electrical load change is caused by a failure of the first electric machine, the one or more controllers are further configured to:
control delivery of electrical power from the energy storage device to the second electric machine to drive the second propulsion assembly.

18. The hybrid electric propulsion system of claim 16, wherein at least one of the one or more sensing devices is positioned adjacent an output shaft mechanically coupling the engine with the first electric machine and at least one of the one or more sensing devices is positioned adjacent an output shaft mechanically coupling the second electric machine with the second propulsion assembly.

19. The hybrid electric propulsion system of claim 16, wherein to determine whether the electrical load change is present, the one or more controllers are configured to:

determine an electrical load rate indicative of the electrical load on the engine over a predetermined time interval based at least in part on the one or more performance indicators; and compare the electrical load rate with a predetermined rate threshold;

wherein if the electrical load rate exceeds the predetermined rate threshold, the one or more controllers determine that the electrical load change is present.

20. The hybrid electric propulsion system of claim 16, wherein controlling the delivery of electrical power within the hybrid electric propulsion system comprises directing electrical power to a resistor bank.

* * * * *